(12) United States Patent
Potnis

(10) Patent No.: US 10,193,328 B2
(45) Date of Patent: Jan. 29, 2019

(54) METHOD AND SYSTEM FOR PROTECTING TRANSFORMERS FROM INTERNAL FIRE

(71) Applicant: Easun—Mr Tap Changers (P) LTD, Tamil Nadu (IN)

(72) Inventor: Shrikant Balkrishna Potnis, Nasik (IN)

(73) Assignee: EASUN-MR TAP CHANGERS (P) LTD, Tamil Nadu (IN)

( * ) Notice: Subject to any disclaimer, the term of this patent is extended or adjusted under 35 U.S.C. 154(b) by 183 days.

(21) Appl. No.: 15/322,726

(22) PCT Filed: Mar. 5, 2015

(86) PCT No.: PCT/IN2015/000118
§ 371 (c)(1),
(2) Date: Dec. 29, 2016

(87) PCT Pub. No.: WO2016/001935
PCT Pub. Date: Jan. 7, 2016

(65) Prior Publication Data
US 2017/0133836 A1   May 11, 2017

(30) Foreign Application Priority Data
Jan. 7, 2014   (IN) .......................... 2137/MUM/2014

(51) Int. Cl.
*H02H 7/04*   (2006.01)
*H02H 1/00*   (2006.01)
*H02H 3/06*   (2006.01)
*H01F 27/40*   (2006.01)

(52) U.S. Cl.
CPC ............. *H02H 7/04* (2013.01); *H01F 27/402* (2013.01); *H02H 1/0023* (2013.01); *H02H 3/066* (2013.01); *H01F 2027/404* (2013.01)

(58) Field of Classification Search
USPC ........................................................ 361/38
See application file for complete search history.

(56) References Cited

U.S. PATENT DOCUMENTS

| 5,946,171 A * | 8/1999 | Magnier ................. H01F 27/14 361/115 |
| 7,869,167 B2 * | 1/2011 | Wakchaure ............. H01F 27/14 361/36 |

(Continued)

*Primary Examiner* — Ronald W Leja
(74) *Attorney, Agent, or Firm* — Porzio Bromberg & Newman P.C.

(57) ABSTRACT

A system and method for preventing a transformer from catching the fire due to internal faults is provided. The system includes a first set of sensors, a timer connected to the first set of sensors, a first breaker, a set of relays and a controller. The first set of sensors is configured to sense the generation of arc. As soon as the arc is detected, incoming supply to the transformer is isolated and the timer is triggered for a pre-determined time to measure the duration for which the faulty condition is persisting in the transformer. This faulty condition will be sensed through the set of relays. When such an abnormal condition persists for a duration set on the trigger of the system, beyond which the controller issues a signal to isolate the power supply. A method of using the system for preventing fire due to internal faults is also disclosed.

4 Claims, 3 Drawing Sheets

(56) References Cited

U.S. PATENT DOCUMENTS

| | | | |
|---|---|---|---|
| 2010/0296205 A1* | 11/2010 | Wakchaure | H01F 27/14 361/36 |
| 2011/0058289 A1* | 3/2011 | Magnier | H01F 27/402 361/38 |
| 2017/0133836 A1* | 5/2017 | Potnis | H02H 1/0023 |

* cited by examiner

METHOD AND SYSTEM FOR PROTECTING TRANSFORMERS FROM INTERNAL FIRE

BACKGROUND

Field of the Invention

The present invention relates to a method and a system for protecting a transformer from catching fire. More particularly, the present invention relates to the method and system for detecting and preventing the fire generated in the transformers due to internal faults.

Description of the Related Art

Generally high voltage industrial transformers are manufactured of steel core and windings of a conducting material. The conducting material is covered with insulating materials such as paper. The transformers may also include other kind of insulating materials such as oil, generally enclosed in a metallic transformer tank. The oil is also used for the cooling of the transformers. The oil and other conducting materials used for the insulation are combustible.

In various applications, the transformers are used heavily for a longer time period and in extreme conditions such as at higher outside temperature, etc. Thus, the occurrence of some kind of fault or deterioration is quite common in transformers. These faults can be caused by voltage overloads, voltage surges, progressive deterioration of the insulation, insufficient oil levels, use of faulty dielectric materials, due to loose connections in joints of transformers, the appearance of moisture or the failure of an insulating component, and so forth. In the event of deterioration, there is a possibility of short circuit with other phases, or short circuit with respect to earth or within the winding. The short circuit causes abnormal currents to flow through the transformer windings. These kinds of failures can cause insulation failure and hence an electrical arc will get generated, which generates heat and a pressure wave inside the transformer which can cause the transformer tank to explode. Since the transformers are expensive equipment, a close and careful attention must be paid to prevent the explosion and fire.

Various methods have been used in the art to protect the transformer from catching fire. Various kinds of safety valves have been installed, which open up automatically in case of an emergency. However, these valves are not a fool-proof method for the protection of the transformers.

U.S. Pat. No. 5,946,171 discloses a method and device for prevention against explosion and fire of electrical transformers. The pressure generation inside the transformer tank is sensed. If the sensed value moves out a predefined threshold, the oil from the tank is drained and an inert gas is injected in the transformer tank to prevent fire. This method makes it possible to prevent the enclosure of the transformer from exploding up to some extent. However, the said method does not provide an indication in advance to take corrective measures. Also, by the time the corrective action takes place, a significant amount of electrical insulation breaks down.

European patent 2,232,510 provides another method for preventing, protecting an OLTC from fire and/or a transformer from explosion. In this patent, the fault is detected by sensing the incoming and outgoing currents of the transformer, along with it by sensing pressure rise through oil surge relay. As soon as the fault is detected, the transformer drains some quantity of oil and injects an inert gas to prevent fire. This method is helpful in preventing explosions in the transformer. However, the time taken for sensing the fire, i.e., the delay time is more. By the time the fire is detected, a lot of internal damage has already been occurred. There is need for providing a method which senses the fire accurately and as quickly as possible thereby reducing the delay time.

In addition to that, in both the methods, when the oil is drained from the transformer tank, it is drained to the external environment, which is hazardous. Thus a method is needed where the exposure of oil to the external environment and wastage of oil can be avoided.

While various other techniques have been used in the past for the prevention of fire in the transformer, there is still room for the development to provide even earlier detection of fire. Thus a need persists for the further contributions in this field of the technology.

SUMMARY

An object of the present invention is to provide a system and method for preventing the transformer from catching the fire caused due to internal faults.

Another object of the present invention is to provide a system and method to detect the fire right at the generation of arc to further reduce the delay time and prevent the transformer from catching the fire.

Yet another object of the present invention is to provide a system and method to avoid the wastage of the insulation oil drained by the transformer tank.

An embodiment of the present invention provides a system for preventing a transformer from catching fire internally, the system comprises a first set of sensors, a timer, a first breaker, a set of relays, a controller, a vacuum bottle and a diaphragm. The first set of sensors senses the generation of arc in the transformer. As the sensors senses the generation of arc, the first breaker isolates the transformer with the incoming power supply. The timer is also triggered ON for a time period TM as soon as the first set of sensors senses the generation of arc. The set of relays configured to sense the faulty condition in the transformer. The controller initiates predefined instructions, if the faulty condition still persists after the time period TM. The first set of sensors includes at least one of a light sensors, arc detectors or ultrasonic sensors. In another embodiment of the present invention, the system includes a vacuum bottle in direct contact with the transformer chamber and a diaphragm present between the transformer and the vacuum bottle, the diaphragm is configured to be broken by a pressure generated in the transformer due to fault and allows the flow of oil into the vacuum bottle and avoids over pressure in the transformer tank. The vacuum helps in draining the oil quickly from the transformer tank and minimizes risk of over pressure getting generated in transformer tank.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

There may be additional components described in the foregoing application that are not depicted on one of the described drawings. In the event such a component is described, but not depicted in a drawing, the absence of such a drawing should not be considered as an omission of such design from the specification.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
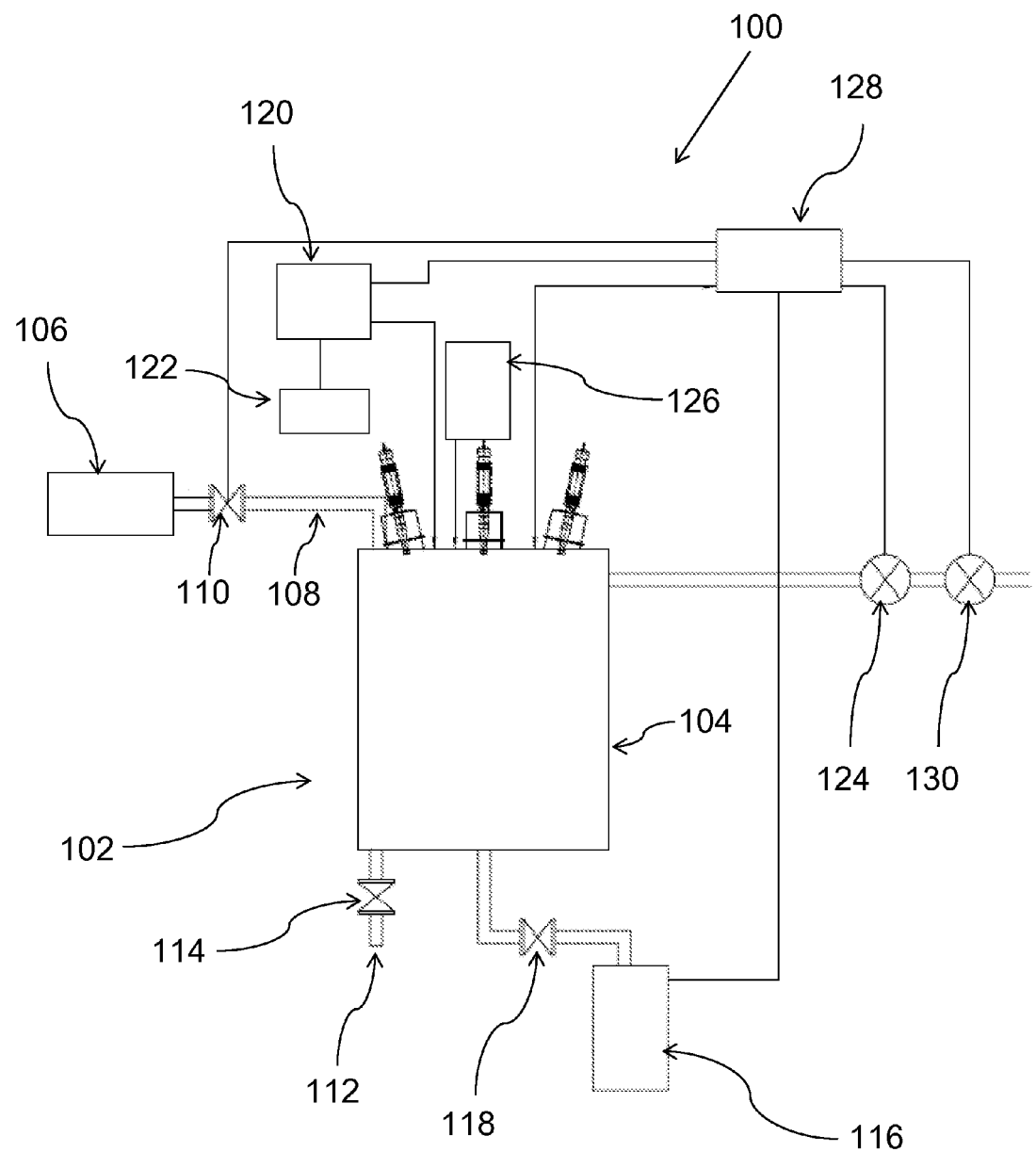
FIG. 1 shows a block diagram of a system for preventing a transformer from catching the fire due to internal faults, in accordance with various embodiments of the present invention.

A block diagram of a system 100 for preventing a transformer 102 from catching the fire due to internal faults is shown in FIG. 1, in accordance with various embodiments of the present invention. The system 100 is configured to detect various conditions which lead to the generation of fire and takes requisite steps to prevent the transformer 102 from catching fire.

The transformer 102 has a transformer core and windings (not shown in the figures). The transformer 102 includes a transformer tank 104 or transformer chamber 104. The transformer tank 104 is filled with an insulation oil/dielectric fluid. The transformer tank 104 is further connected with an oil reservoir 106 carrying the insulating oil. The oil reservoir 106 is connected to the transformer tank 104 through a pipe 108controlled by a first valve 110. The transformer tank 104 also contains a drainage pipe 112controlled by a second valve 114. The transformer tank 104 is also connected to a gas container 116 containing an inert gas. The entry of gas from gas container 116 to the transformer tank 102 is controlled by a third valve 118. In an example, the inert gas used is Nitrogen or Argon, though the use of any other inert gas is well within the scope of this invention.

The system 100 further includes a first set of sensors 120, a timer 122 connected with the first set of sensors 120, a first breaker 124, a set of relays 126 and a controller 128, as shown in FIG. 1, according to an embodiment of the present invention. The first set of sensors 120 is configured to detect the generation of an arc in the transformer 102. As soon as the arc is detected the first breaker 124 isolates the transformer 102 with an incoming power supply (not shown) through a command given by the controller 128. At the same time the arc is detected, the timer 122 is also triggered for a time period TM.

In case the faulty condition still persists even after the isolation using the first breaker 124, the set of relays 126are provided to sense the faulty condition in the transformer 102. The set of relays 126 includes earth fault relays, over current protection relays or any other such protective relays usually fitted on the transformer 102 to sense any faulty condition.

The transformer 102 is in electronic communication with the controller 128, the first set of sensors 120 and the set of relays 126. The controller 128 is configured to check if the faulty condition persists for more than the time period TM in the transformer, the controller 128 initiates multiple predefined instructions in order to prevent the transformer 102 from catching the fire.

A signal is sent to a backup breaker 130 to isolate the power supply of the transformer 102. In addition to that, the controller 128 also sends signal to shut off the first valve 110 between the transformer tank 104 and the oil reservoir 106 to stop inflow of insulation oil from the oil reservoir 106 to the transformer tank 104. Further, the controller 128 also sends the signal to open the second valve 114 in order to drain the predetermined quantity of insulation oil used in the transformer tank 104 to avoid building of over pressure inside the transformer tank 104. And finally, the controller 128 also operates the third valve 118 which will inject an inert gas like Nitrogen inside the transformer 102 to prevent the Oxygen to come in contact with the insulation oil of the transformer 102 and thus to prevent the transformer 102 from explosion as well as from fire.

The first set of sensors 120 includes the arc detectors 120 configured to detect the generation of arc inside the transformer tank 104 according to an illustrative embodiment of the present invention. In another example, the first set of sensors 120 can also include a light sensor making use of photo property of arc to detect the generation of arc. The light sensor can be sensed using fiber optics sensing method. In another example, the first set of sensors 120 is any sensor which is configured to detect any kind rays emitted by the arc such as an ultraviolet sensor.

In another embodiment of the present invention, the first set of sensors 120 includes an ultrasonic sensor 120, as shown in FIG. 1. Every arc is associated with a high frequency sound and the sound wave travels faster in liquid medium as compared its propagation in air. This sound wave is captured by the ultrasonic detectors 120. The detection of arc sound wave and rise in abnormal current through current sensing relay results in sending the tripping command to isolate the incoming power supply to the transformer 102.

A flowchart 200 showing the steps involved in preventing the transformer 102 from catching the fire due to internal faults using the system 100 is shown in FIG. 1, in accordance with an embodiment of the present invention. At step 202, when an arc is generated inside the transformer 102 due to internal faults, at step 204, the arc is detected using the first set of sensors 120. In an embodiment of the invention, the first set of sensors 120 are the arc detectors. In another embodiment, the first set of sensors 120 are the light sensors to sense the arc using fiber optic light sensing or any other kind of light sensor. At step 206, as soon as the arc is detected by the first set of sensors 120, a trip command is given to the first breaker 124 to isolate the incoming power supply of the transformer. At step 208, at the same time when the arc is detected by the first set of sensors 120, the timer 122 is also triggered. The timer 122 is set at a time period TM. At step 210, the set of relays 126 senses the faulty condition in the transformer 102.

At step 212, the controller 128 checks the faulty condition persists for more than the time period TM, the controller 128 initiates a predefined set of instructions. In an embodiment of the present invention, the predefined instructions are as follows: At step 214, the incoming power supply of the transformer is isolated using a backup breaker 130. At step 216, the inflow of oil from the oil reservoir 106 to the transformer tank 104 is stopped. At step 218, the dielectric fluid is released from the transformer 102. And finally at step 220, the inert gas is inserted in the transformer 102 from the gas container 116.

Figure 2:
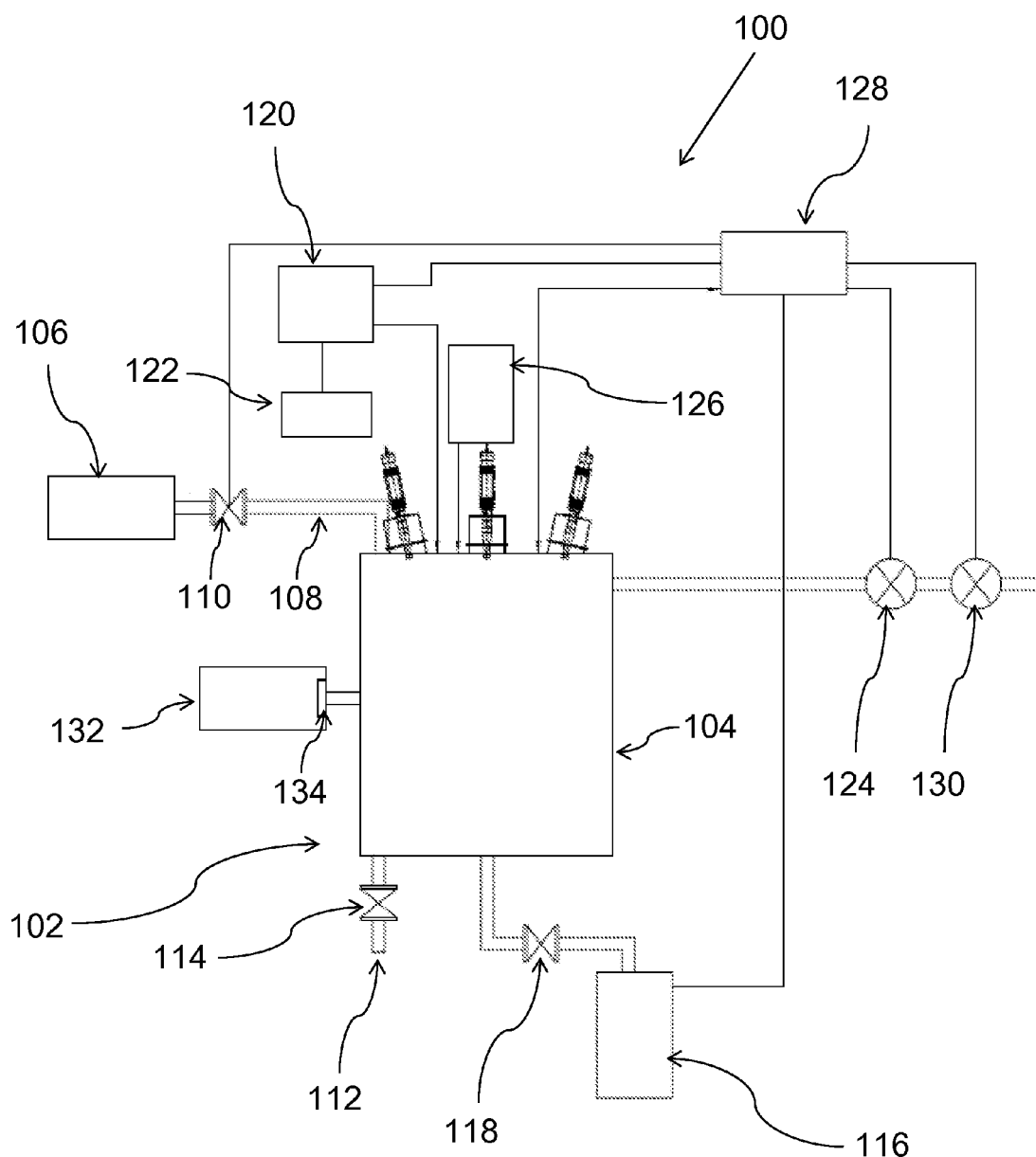
FIG. 2 shows a block diagram of the system for preventing the transformer from catching the fire due to internal faults along with a vacuum bottle, in accordance with an embodiment of the present invention.
Figure 3:
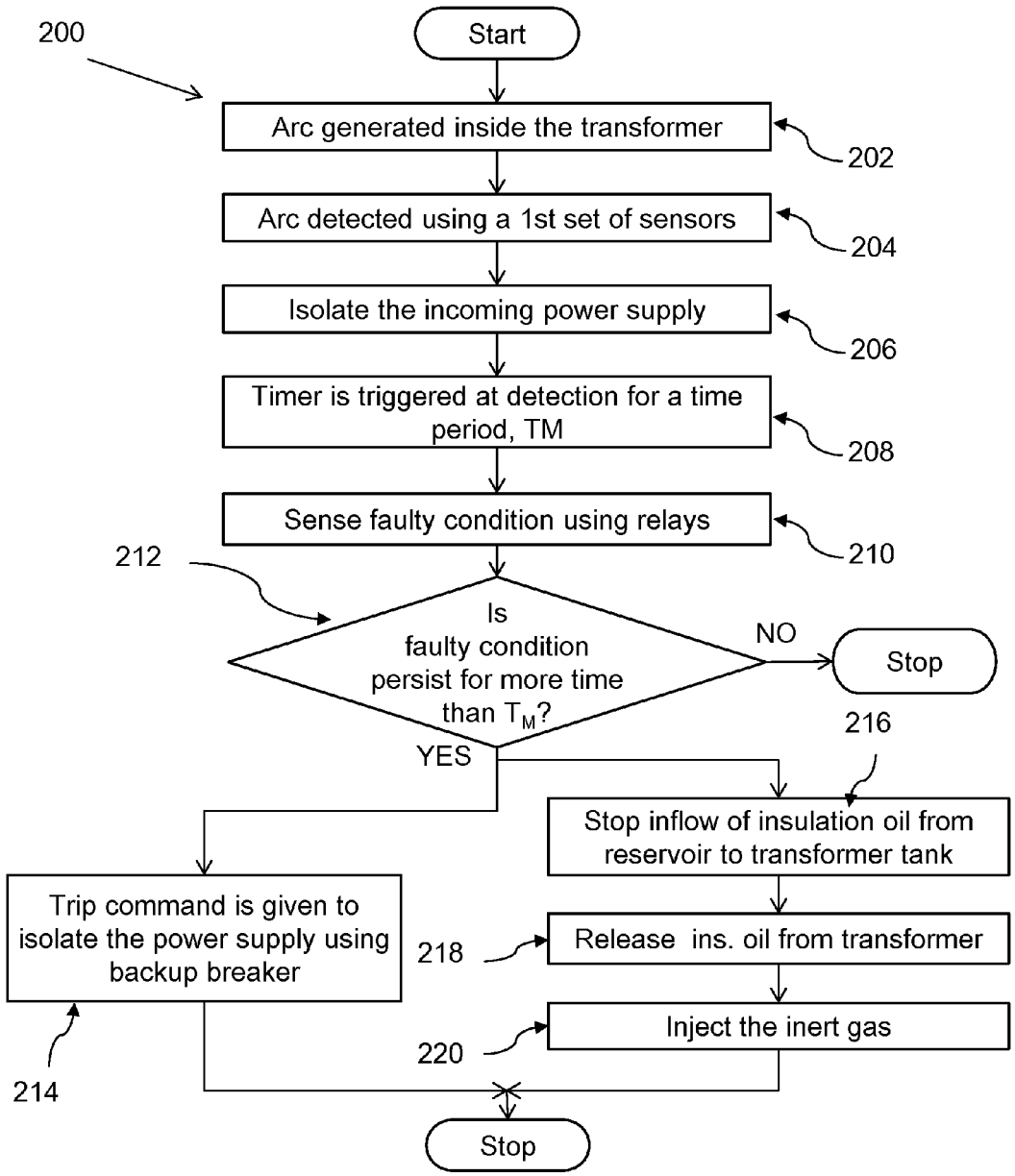
FIG. 3 is a flowchart showing the steps involved in preventing a transformer from catching the fire due to internal faults using the system described in FIG. 1, in accordance with various embodiments of the present invention.

According to an exemplary embodiment of the present invention, the system 100 also includes a vacuum bottle 132 and a diaphragm 134 present between the vacuum bottle 132 and the transformer tank 104 as shown in FIG. 2. The diaphragm 134 is fitted in between the insulating oil of the transformer 102 and the vacuum bottle 132. The diaphragm 134 is configured to burst at a pre-determined pressure value inside the transformer tank 104, thereby allowing the vacuum bottle 132 to suck a desired quantity of oil rapidly. This avoids the building of over-pressure in to the transformer tank 104 and further reduces the chances of catching fire. This also saves unnecessary wastage of insulating oil and opening into atmosphere, which may be hazardous.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

What is claimed is:

1. A system for preventing a transformer from catching an internally generated fire, the system comprising:
   a first set of sensors configured to sense the generation of an arc in the transformer;
   a timer configured to be triggered ON when the first set of sensors senses the generation of the arc, wherein the timer is triggered for a time period TM;
   a first breaker to isolate an incoming power supply to the transformer;
   a set of relays to sense the faulty condition in the transformer;
   a controller configured to initiate a predefined instructions, if the faulty condition still persists after the time period TM;
   a vacuum bottle in direct contact with the transformer chamber; and
   a diaphragm present between the transformer and the vacuum bottle, wherein the diaphragm is configured to be broken by a pressure generated by the transformer, thereby allowing the vacuum bottle to suck the oil from the transformer chamber.

2. The system of claim 1, wherein the predefined instructions include at least one of:
   isolating the incoming power supply to the transformer using a backup breaker;
   shutting off entry of oil from an oil reservoir to transformer tank using a first valve;
   opening the position of a second valve to allow the release of the transformer dielectric fluid; and
   allowing the insertion of an inert gas in the transformer chamber.

3. The system of claim 1, wherein the first set of sensors includes at least one of sensors, a light sensors or ultrasonic detectors.

4. A method for preventing a transformer from catching fire internally, the method comprising:
   sensing generation of an arc in the transformer using a first set of sensors;
   triggering a timer ON when the first set of sensors senses the generation of arc, wherein the timer is triggered for a time period TM;
   isolating the incoming supply of the transformer using a first breaker;
   sensing the faulty condition in the transformer using a set of relays; and
   initiating predefined instructions by a controller, if the faulty condition still persists after the time period TM, wherein the predefined instructions includes at least one of:
   isolating the incoming power supply to the transformer using a backup breaker;
   shutting off entry of oil from an oil reservoir to transformer tank using a first valve;
   opening the position of a second valve to allow the release of the transformer dielectric fluid; and
   allowing the insertion of an inert gas in the transformer chamber.

* * * * *